United States Patent Office 3,286,543
Patented Nov. 22, 1966

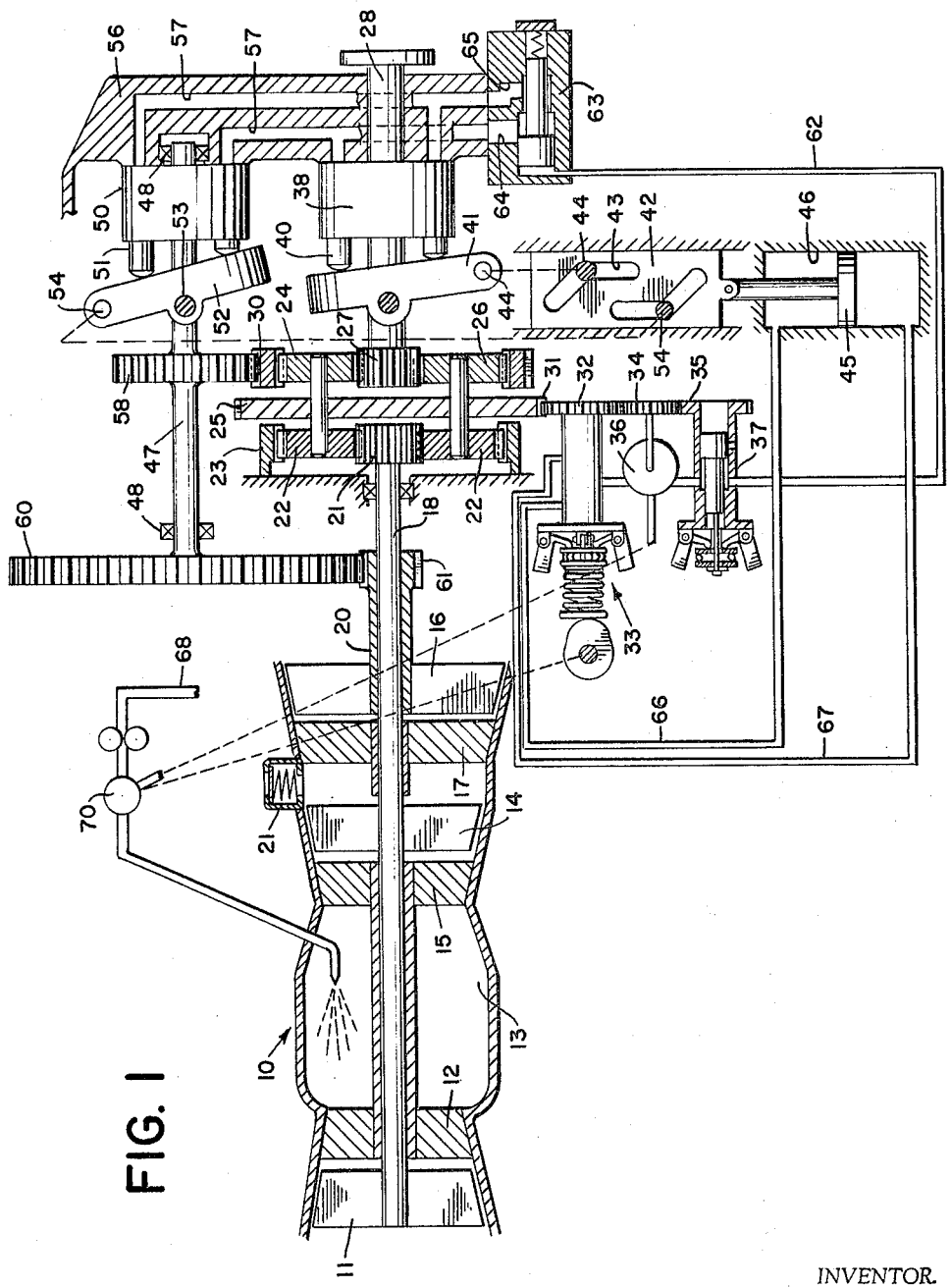

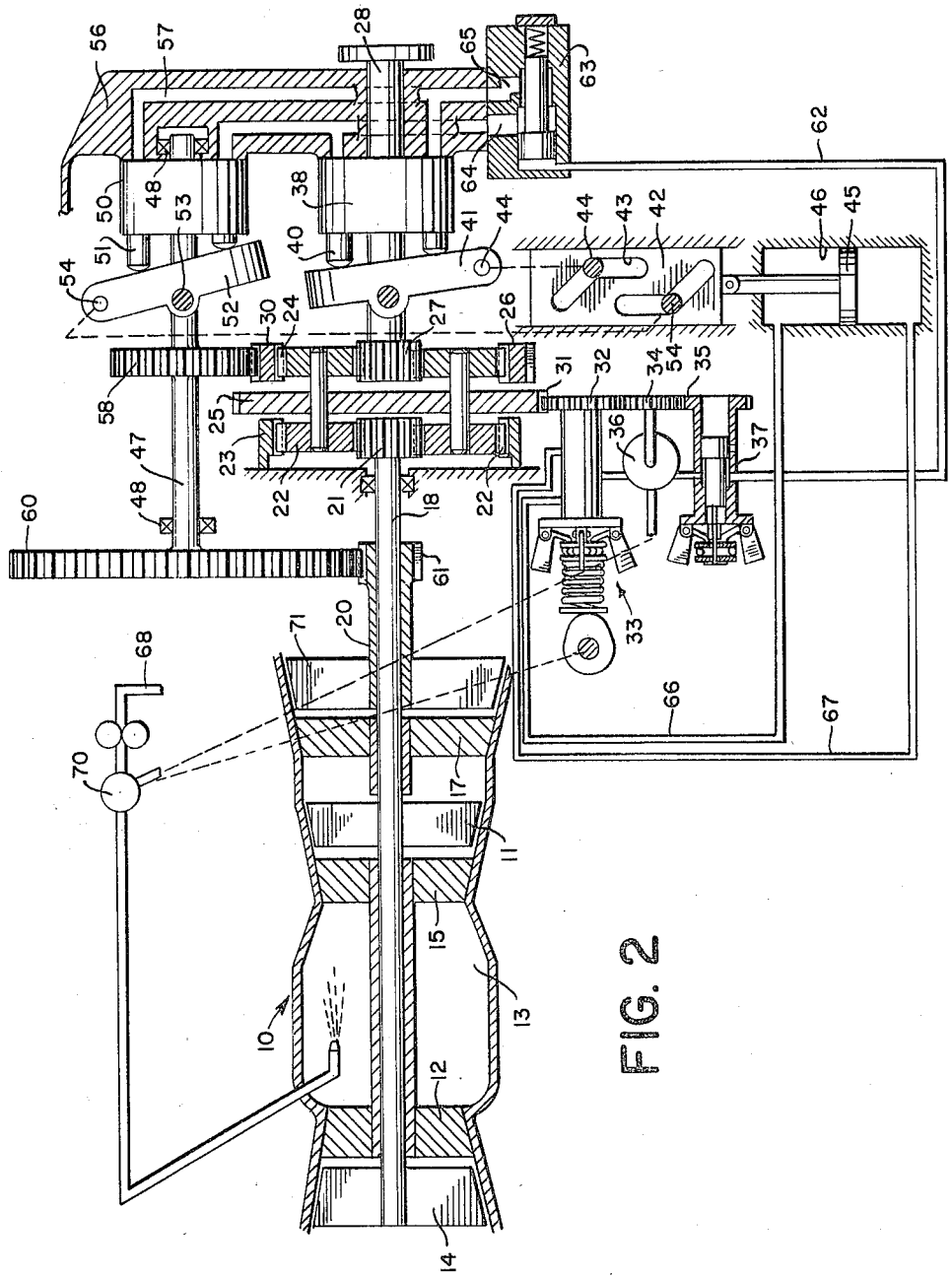

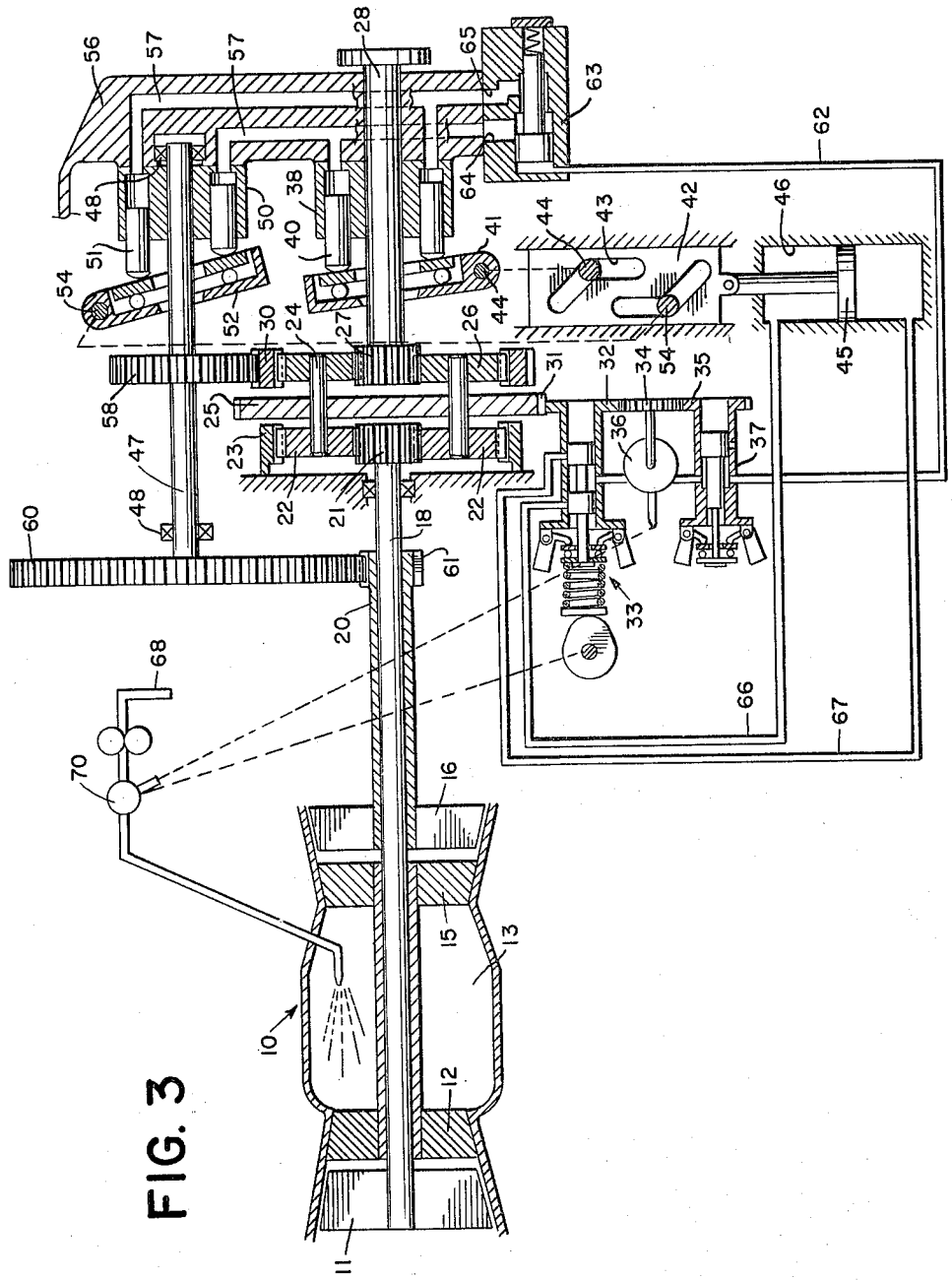

3,286,543
COMBINED TURBINE AND HYDRO-MECHANICAL TRANSMISSION
Kenneth W. Porter, Northport, N.Y., assignor to Fairchild Hiller Corporation, a corporation of Maryland
Filed July 12, 1963, Ser. No. 294,586
15 Claims. (Cl. 74—472)

The present invention relates to a combined gas turbine and hydromechanical transmission particularly adapted for use in vehicles especially vehicles having low power in relation to weight such as heavy trucks, tractors, tanks and the like.

Gas turbine engines have recently been developed for automotive use. For such use the ordinary single shaft turbine engine is not practical since the compressor is directly driven by the turbine and at part power or low speed when the maximum torque output is required by a vehicle the compressor absorbs the total energy drive developed by the turbine and the system is inoperative. In brief, the single shaft turbine arrangement, while efficient and extremely useful for service in which a constant high speed is maintained, is not practical for automotive use, which requires efficient operation over a wide range of output speed.

At the present time a number of manufacturers are making automotive gas turbines. These turbines are of the split turbine variety, that is, a turbine and compressor or gasifier unit is mounted on one shaft and a second power turbine is mounted in series on a second shaft which is the output shaft to the vehicle transmission. This arrangement is practical for a passenger car although it has disadvantages. One of the disadvantages is that its maximum positive or stall torque is only approximately two and one-half times the torque at maximum speed with the result that a gear box or like transmission must usually be employed. Moreover, even when a gear box is supplied, it is virtually impossible to effect a shift without the risk of overspeeding of the power turbine.

Another disadvantage is that, due to the output turbine or turbine section being entirely separate from the compressor, there is substantially no braking torque. Although his disadvantage has been overcome, it has been done by the use of adjustable vanes in the power turbine section which vastly increases the complexity and expense of the system.

A gas turbine of the type just described has been successfully used in a heavy duty truck utilizing a hydromechanical transmission placed between the output of the second power turbine and the vehicle driving wheels and permitting a continuous variation of output torque and speed over a range from 1:1 to 10:1. This system utilized a multielement hydrostatic torque converter of the type disclosed in Ebert Patent No. 3,074,296 issued January 22, 1963 and a control system similar to that of application Serial No. 175,552 filed by Hollowell on February 26, 1962, and assigned to the assignee of the present invention.

The proposed use of a single shaft turbine with the hydrostatic transmission as mentioned above, while overcoming many of the disadvantages of a split shaft transmission unit, results in an extremely bulky unit since the turbine requires large mass flows and since the hydrostatic unit necessary to provide the torque range consists of a plurality of hydrostatic motor elements, and requires the usage, in addition, of a mechanical clutch arrangement to connect certain of the hydrostatic elements to the output shaft.

The present invention overcomes the disadvantages of the gas turbine hydromechanical drive unit by combining the units in such a manner that many of the hydrostatic elements can be eliminated while at the same time maintaining the large ratio of stall torque to maximum speed torque which is required for heavy duty vehicular usage. In accomplishing this result I arrange the units so that a differential gearing is interposed between the gas turbine output shaft and the final output shaft to the driving wheels of the vehicle. A second output from the planetary gearing drives a hydrostatic pump element in a well known manner as shown in the Ebert patent above mentioned.

In addition, however, this second output is coupled by means of a speed increasing gearing to one of the elements of the gas turbine system. In one instance this element is the single compressor of the system and in another instance is one of two turbine sections or stages. In a preferred form, however, the second output of the differential gearing is coupled to a compressor which is on a shaft independent of the turbine shaft, this form of the invention having advantages over the forms heretofore mentioned as will appear hereinafter.

It is an object of the invention to provide a prime mover for heavy duty vehicles such as trucks, tractors, tanks and the like which is capable of providing a stall torque of approximately ten times the torque at maximum speed, or higher.

It is another object of the invention to provide such a prime mover system which is compact and which requires a minimum number of hydrostatic converter elements.

It is a further object of the invention to provide such a system which provides large negative torque and which therefore serves to brake the vehicle without the necessity of complicated structure for altering the angle of the turbine nozzles or vanes.

It is a further object of the invention to provide such a system which utilizes controlling valves and mechanism of the type shown in the Hollowell application above mentioned and which operates to provide a minimum fuel consumption throughout its range of power output.

It is a still further object of the invention to provide such a prime mover system which does not require an excessively high idling speed in order to prevent stalling when the load is applied.

Other objects and features of the invention will be apparent when the following description is considered in connection with the annexed drawings, in which, FIGURE 1 is a schematic drawing showing the preferred embodiment of my invention in which a gas turbine having two independently mounted compressors is utilized to drive a hydromechanical transmission;

FIGURE 2 is a view similar to FIGURE 1 but showing a gas turbine system having a single compressor unit and two turbine sections which drive a hydromechanical transmission; and FIGURE 3 is a view, again in schematic form, showing the hydromechanical transmission combined with a gas turbine engine having a single turbine and single compressor section, the compressor rotor being mounted for movement independently of the turbine.

Referring now to the drawings and particularly to FIGURE 1 thereof, there is shown at 10 a gas turbine which comprises the turbine rotor 11, turbine fixed inlet vanes 12, and combustion chamber 13 together with a first compressor section comprising the rotor 14 and fixed vanes 15 and a second compressor section comprising a second rotor 16 and a second set of fixed vanes 17. As is readily apparent from the drawing, the compressor rotor 14 and turbine rotor 11 are fixed to the shaft 18 which thus become the output shaft of the turbine engine.

The compressor rotor 16 is mounted for rotation independently of the rotors 11 and 14 and is, in the particular instance, shown mounted on a sleeve 20 which is in turn rotatably mounted on the shaft 18. Fixedly mounted on the shaft 18 is a sun gear 21 which, as will appear, is the input to a planetary reduction gear used in series with a planetary differential gear set. Planet gears 22 mesh with the sun gear 21 and likewise mesh with a fixed internally toothed ring gear 23. The planet gears 22 are rotatably mounted on shafts 24, the shafts 24 being mounted in a spider member 25. At the opposite ends of shafts 24 are mounted planet gears 26 which mesh with the sun gear 27 fixed to the output shaft 28 as well as with the internal teeth of a ring gear 30.

The spider member 25 has fixed hereto or formed integrally therewith an externally toothed ring gear 31 which meshes with a gear 32 which drives a centrifugal governor 33. Additionally, by means of the gears 34 and 35 a pump 36 is driven from the spider 25 as is a second centrifugally operated valve 37.

Also mounted on the output shaft 28 is a hydrostatic motor unit 38, the piston elements 40 of which cooperate in the usual manner with a swash plate 41, the swash plate angle being controlled through the medium of the cam plate 42, the slot 43 of which surrounds a pin 44 extending outwardly from the swash plate 41. The cam plate 42 is reciprocably mounted in suitable guides for generally reciprocatory movement, the plate being actuated by the piston 45 of an actuator cylinder 46.

Mounted on a shaft 47 which is independently rotatably mounted in bearings 48 is a hydrostatic pump element 50 the pistons 51 of which cooperate with a swash plate 52 which swash plate is pivotally mounted in fixed trunnions as indicated at 53 in a similar manner to the mounting of the swash plate 41. Pins 54 of the swash plate 52 extend into a cam slot 55 of the cam plate 42, the cam slots being so designed that the pivotal movements of the swash plates 41 and 52 are coordinated. In the usual manner, a porting plate 56 is provided interconnecting the hydraulic motor unit 38 and the pump unit 50. This porting plate is shown in purely schematic form and it will be understood that it comprises a pair of ports for the pump unit 50 as well as a pair of ports for the motor unit 38. Each port is generally arcuate and extends over substantially half of a circle circumference on which the pistons 51 or 40, as the case may be, and their cooperating cylindrical bores in the barrel of the pump or motor unit, are arranged. The passages 57 in the porting plate 56 thus serve merely to connect the pair of pump ports with respective one of the pair of motor ports, the detail of such an arrangement being disclosed in greater detail in the patent and patent application mentioned heretofore.

Fixed to the shaft 47 is a gear 58 which meshes with external teeth on the ring gear 30. Also fixed to the shaft 47 is a gear 60 which meshes with a gear 61 formed integrally with or fixedly attached to the sleeve 20, the gears 60 and 61 serving as a speed increasing gearing set between shaft 47 and sleeve 20.

The centrifugal governor of the centrifugally operated governing valve 37 is connected by means of the hydraulic line 62 to a bypass valve 63 which valve has ports 64 and 65 communicating with the passages 57 of the porting plate 56. The bypass valve 63 is provided with differential areas exposed to the pressures in the passages 57 and produces an axial force which tends to oppose the opening of the bypass, the force being proportional to the pressures in the passages 57 which pressures are a function of the load on the output shaft 28, the angle or attitude of the swash plates 41 and 52 and the torque applied from the gas turbine shaft 18. The details of the bypass valve are shown and described in the Hollowell application above identified.

The ports of the centrifugally controlled valve or governor 33 are connected by means of pipes 66 and 67 to opposite ends of the cylinder 46 and thus are effective to control the position of the swash plates 41 and 52.

In order to describe the operation of the preferred embodiment of the invention, the mechanical arrangement of which has just been described, it will be assumed that the gas turbine hydromechanical transmission is mounted in a vehicle which is at rest with the engine not operating. The vehicle is supplied with the usual electrically operated starting motor and in order to start the turbine this motor is energized.

At this time the output shaft will be stalled and the swash plates may be set at any convenient angle since the bypass valve 63 will be in position permitting communication between the high and low pressure sides of the pump and motor hydrostatic units. The operation of the starting motor raises the speed of both compressor rotors 14 and 16, the rotor 14 being directly driven by the starter motor and the compressor rotor 16 being driven at a high speed due to the fact that the output shaft 28 is stalled and the output of shaft 28 thus transmitted through the planetary gear set and gears 30, 58, 60 and 61 to the sleeve 20. The starter motor is energized until sufficient air is forced into the combustion chamber 13 to be mixed with fuel and burned to drive the turbine rotor 11 and overcome the residual friction and aerodynamic drag.

Normally at starting the ratio of displacement between hydrostatic pump unit 50 and hydrostatic motor unit 38 is set at a maximum commensurate with the safety of the system when the bypass valve 63 is closed. That is, the swash plate 41 is set at its maximum angle and the swash plate 52 at a very slight angle relative to the shaft 28.

Since the bypass valve is open, the pump unit 50 will rotate freely at a fixed proportion of the speed of shaft 18, the proportion being determined by the gear ratios of the planetary set.

When sufficient fuel is added to the combustion chamber the speed of the compressor rotor 11 will first increase and, it being assumed that the bypass valve 63 remains open, the additional power produced will cause an increase in the speed of the differential output gear 30 and of the hydraulic pump unit 50 as well as an increase in speed of the compressor rotor 16 up to the speed level where the pumping energy losses of both the hydraulic unit 50 and the compressor rotor 16 balance the new power input level.

In order to drive the load or, in other words to start the vehicle in motion, the power demand is increased by the operator until at a predetermined speed of the shaft 18 and of course of the spider gear 31, the control system automatically causes the bypass valve to be actuated moving its differential piston to the right as seen in FIGURE 1 and thereby gradually closing the bypass between the passages 57. As explained in the patent and the application above referred to this arrangement of the bypass valve 63 gives a smooth shock-free engagement of the drive as the bypass valve closes.

With this valve closed the fluid displaced by the rotation of the hydraulic pump unit 50 is forced into the cylinders of the motor unit 38 thereby producing a torque which is impressed on the output shaft and adds to the torque supplied from the gear 27. At this time the total torque on the output shaft 28 may or may not be sufficient to overcome the load resistance on the output shaft 28. If it is not, then the operator by further actuation of the accelerator will supply additional fuel until the load resistance is overcome. When this occurs, as the speed of output shaft 28 increases, the speed of shaft 47 will decrease thus reducing the amount of power transmitted hydraulically through the pump unit and motor unit 50 and 38 respectively and increasing the amount of power transmitted mechanically to the shaft 28 until an equilibrium condition of output shaft speed is reached, that is, until the vehicle, assuming that it is moving over a level surface, does so with a uniform speed.

If the accelerator is now operated to increase the fuel supply the action of the governor 37 will cause the piston of the cam plate actuator to move thereby moving the cam plate and increasing the displacement of the pump unit 50 and thereafter reducing the displacement of the motor unit 38 thereby causing the output shaft to turn at a faster rate until a new equilibrium is reached.

Ultimately the displacement of the motor unit or more accurately of the pistons of the motor unit 38 will be reduced to zero, that is, the swash plate 41 will lie in a plane perpendicular to shaft 28 and the pump unit 50 and the elements connected directly thereto will be locked stationary. At this time, therefore, the compressor rotor 20 will not be rotating and the power output of the turbine will be limited by the maximum permissible temperature of the combustion products of the air pumped by the compressor rotor 14 only and the fuel applied by the fuel control through the fuel supply pipe 68 and fuel control valve 70. In order to reduce aerodynamic drag through the compressor section comprising the stationary vanes 17 and rotor 16, a valve 71 is provided between the two compressor sections which valve opens when the pressure drop of air through the compressor section including the rotor 16 becomes excessive.

If the load on the output shaft 28 now increases as for example by the vehicle encountering an upgrade, the output shaft 28 will tend to slow down for the same power input at shaft 18 and with the ring gear 30 locked the input shaft 18 will also tend to slow down. The governor 33 will then cause the actuator, cam plate 42, and swash plate 41 to move in a direction to increase the displacement of the hydraulic motor unit pistons 40 thus permitting the pump unit to discharge fluid and unlocking the output ring gear 30. The effect of this will be to multiply torque hydraulically between the pump unit 50 and motor unit 38, this torque being added to the torque then existing on the output shafts and tending to overcome the additional load resistance caused by the upgrade.

At the same time the compressor rotor 16 will be rotated through the speed increasing gearing 61, valve 71 will close and the compressor driving power thus subtracted from the shaft 47 will be utilized to supply additional air to the gas turbine set thereby developing more torque aerodynamically in the turbine section 11, 12 and of course adding torque to the shaft 18. This same torque will of course be added to the input gear 21 and through the planetary differential gear set to the output shaft 28. Thus any reduction in the speed of the output shaft 28 will be compensated by hydraulic and aerodynamic torque multiplication within the power train to provide essentially a constant output horsepower on the shaft 28.

It should be noted that the additional air flow resulting from operation of the compressor rotor 16 will ordinarily reduce the turbine inlet temperature for a constant fuel input. Since the power limitation of a gas turbine set is usually dependent on the turbine inlet temperature, this novel arrangement permits additional fuel to be added to the gas turbine to raise the power level and thus tends to maintain a high output shaft speed without exceeding the permitted maximum turbine inlet temperature.

The airflow characteristics of a conventional gas turbine set operating at a given turbine inlet temperature does not usually permit sudden increases in fuel supply because the resulting increase in turbine temperature at the same mass flow will raise the pressure in the combustion chamber 13 which is, of course, connected to the discharge passage of the compressor. An excessive change in discharge pressure at the compressor may result in surging flow reversal in the compressor which is a useless and dangerous condition.

As indicated hereinabove the new arrangement operates to maintain or increase the compressor pressure ratio by supercharging action and therefore permits greater accelerator fuel flow schedules without causing the compressor to enter a surge condition, thereby resulting in faster possible acceleration of the gas turbine power train.

As is well known, the partial load operation of a conventional gas turbine is uneconomical because any reduction in compressor speed will also reduce the pressure ratio of the turbine set, thus causing an increase in specific fuel consumption. With the novel arrangement above described the overall pressure ratio of the two compressor sections may be held substantially constant as the output speed of the gas turbine power train is reduced and therefore the maximum turbine inlet temperature can be maintained with resulting economy in fuel consumption.

As has been pointed out hereinabove, with a conventional two-shaft automotive type turbine wherein the power turbine is "free," little aerodynamic braking effect is available when the power turbine is vehicle driven as of course frequently occurs when coming to a stop or on a down grade.

With the novel arrangement above described, however, high aerodynamic braking force is always available and the braking force progressively increases as the output shaft slows.

The novel arrangement above described has the advantage that the torque multiplying ability at stall of the output shaft is not limited as it is with the free power turbine. As pointed out above, with the novel arrangement of my invention a stall torque of approximately ten times the torque obtained at full speed may be obtained whereas with the free power turbine of the conventional arrangement the stall torque is limited to approximately twice the normal torque at full speed. This degree of torque multiplication is inadequate for most automotive applications and is especially so for heavy trucks and tracked vehicles of low power to weight ratio. Moreover, with the split turbine arrangement wherein the power turbine is free the specific fuel consumption is greatly increased when the ideal power turbine to gasifier speed ratio is departed from.

In comparing my novel arrangement with the use of a conventional single shaft turbine followed by a torque multiplying hydrostatic transmission, it will be found that the complexity and expense of the arrangement far exceeds that of my novel arrangement, since with my novel arrangement the planetary gear set which is normally present in hydrostatic transmissions of the type described in the Ebert patent is utilized without addition, and the number of hydrostatic motor units is reduced and other elements such as the clutch for one of the hydrostatic motor units is eliminated. With my novel arrangement, furthermore, the increase in torque multiplication is achieved while maintaining operation with minimal specific fuel consumption.

The above has described the preferred form of my invention and the form which provides the greatest advantage. However, other forms of the invention are possible and provide many of the advantages of the preferred form just described. Amongst these other forms are those illustrated in FIGURES 2 and 3.

Referring now to FIGURE 2 there is shown therein a system which is generally similar to that of FIGURE 1 differing therefrom primarily in that in place of a single turbine and two compressors, two turbines are provided with a single compressor unit. In this arrangment the turbine rotor 11 and compressor rotor 14 are fixed to the shaft 18 in the same manner as indicated in FIGURE 1. However, instead of having a second compressor rotor fixed to the sleeve 20 a second turbine rotor 71 is fixed to this sleeve.

The operation of the split turbine device of FIGURE 2 is substantially identical to that of FIGURE 1 save, however, that as is obvious the second turbine stage adds its torque to the shaft 47 and through it and the planetary gearing to the output shaft 28. However, due to the use of the two turbines in place of the two compressors the aerodynamic torque multiplication provided by the system is less and the ratio of stall torque to full speed torque is considerably decreased.

Additionally, there are practical difficulties involved since the turbine sections are immediately adjacent the gear box and this tends to make the design of gears and bearings difficult. Nonetheless, as stated hereinabove, the arrangement of FIGURE 2 is preferable to any presently used arrangement and is preferable to the free power turbine discussed above particularly in that it supplies a negative torque for braking without the use of variable vanes or like constructions and is therefore less expensive to construct while at the same time producing superior operating characteristics.

FIGURE 3 illustrates a third embodiment of the invention in which a single turbine and single compressor section are utilized. Here the turbine rotor 11 is mounted directly on the shaft 20 while the single compressor rotor 16 is mounted on the sleeve 20 in the same manner as in FIGURE 1. This arrangement produces many of the advantages of the device of FIGURE 1 but is limited in its range of torque multiplication ratio due to the fact that the swash plate 41 can never be set at zero displacement since if this were done the ring gear 30, shaft 47 and sleeve 20 would be locked in a stationary position and there would be no air supply to the combustion chamber 13.

Of course, additionally, the single compressor cannot supply air to the combustion chamber at the almost uniform rate which is inherent in the design of FIGURE 1 and therefore the maximum power output range of the turbine is more limited.

It will of course be understood that in all the embodiments of this invention means are provided such as those shown in the Ebert patent for setting the motor swash plate at a negative angle in order to drive the vehicle in a reverse direction.

It will also be clear that although axial flow compressors have been described, compressors of the centrifugal type may be utilized and that other modifications may be made. I wish therefore not to be limited to the embodiments of the invention described but, on the contrary, I wish to be limited solely by the claims granted to me.

What is claimed is:

1. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft forming the power output of said engine, a differential gear set driven by said rotor power output shaft, a continuously variable torque multiplying transmission interposed between a first output of said differential gear set and a second output thereof, said second output being coupled to drive a load and means mechanically coupling another one of said gas turbine engine rotors to the first output of said differential gear set.

2. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft forming the power output of said engine, a differential gear set driven by said rotor output shaft, a continuously variable hydrostatic transmission interposed between a first output of said differential gear set and a second output thereof, said second output being coupled to drive a load and means mechanically coupling another one of said gas turbine engine rotors to the first output of said differential gear set.

3. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft forming the power output of said engine, a differential gear set driven by said rotor output shaft, a hydrostatic transmission comprising a pump unit and a motor unit, said pump unit being coupled to one of the two outputs of said differential gear set and said motor unit being coupled to the other output of said differential gear set, said other output also being coupled to drive a load and means mechanically coupling another gas turbine engine rotor to said one output of said differential gear set.

4. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft froming the power output of said engine, a differential gear set driven by said rotor output shaft, a hydrostatic transmission comprising a variable displacement pump unit and a variable displacement motor unit, said pump unit being coupled to one of the two outputs of said differential gear set and said motor unit being coupled to the other output of said differential gear set, said other output also being coupled to a load, means mechanically coupling another gas turbine engine rotor to said one output of said differential gear set, and means for varying the displacement of said pump and motor units to thereby modify the engine torque multiplication in said hydrostatic transmission and in said turbine and maintain a substantially constant horsepower output to drive a load.

5. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft forming the power output of said engine, a differential gear set driven by said rotor output shaft, a hydrostatic transmission comprising a variable displacement pump unit and a variable displacement motor unit, said pump unit being coupled to one of the two outputs of said differential gear set and said motor unit being coupled to the other output of said differential gear set, said other output also being coupled to drive an external load, means mechanically coupling another gas turbine engine rotor to said first output of said differential gear set, means for varying the displacement of said pump and motor units to thereby modify the torque multiplication in said hydrostatic transmission and the torque multiplication of said gas turbine engine, said means comprising swash plates the angle of which relative to the respective hydrostatic units is variable, and cam means for varying the relative angles of said swash plates and hydrostatic units.

6. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft forming the power output of said engine, a differential gear set driven by said rotor output shaft, a hydrostatic transmission comprising a variable displacement pump unit and a variable displacement motor unit, said pump unit being coupled to one of the two outputs of said differential gear set and said motor unit being coupled to the other output of said differential vehicle, means mechanically coupling another gas turbine engine rotor to said first output of said differential gear set, means for varying the displacement of said pump and motor units to thereby modify the torque multiplication in said hydrostatic transmission and the torque multiplication in said gas turbine engine, said means comprising swash plates pivotally mounted to lie at variable angles relative to the respective hydrostatic units, cam means for varying the angles of said swash plates, a fuel supply valve and governor means operated by said engine output shaft and biased in accordance with the position of said fuel supply valve to actuate said cam means to thereby produce a substantially constant horsepower output to drive said vehicle.

7. A prime mover-transmission comprising, in combination, a gas turbine engine having at least one turbine rotor, at least one compressor rotor, and a combustion chamber in which air from said compressor rotor is burned with fuel and the gases fed to said turbine rotor, means coupling a turbine rotor to a shaft forming the power output of said engine, a differential gear set driven by said rotor output shaft, a hydrostatic transmission comprising a variable displacement pump unit and a variable displacement motor unit, said pump unit being coupled to one of the two outputs of said differential gear set and said motor unit being coupled to the other output of said differential gear set, said other output also being coupled to drive in external load, means mechanically coupling another said gas turbine engine rotor to said first output of said differential gear set, means for varying the displacement of said pump and motor units to thereby modify the torque multiplication in said hydrostatic transmission and the torque multiplication of said gas turbine engine, said means comprising swash plates pivotally mounted to lie at variable angles relative to the respective hydrostatic units, cam means for varying the angles of said swash plates, a fuel supply valve, governor means operated by said engine output shaft and biased in accordance with the position of said fluid supply valve to actuate said cam means, a valve connected in the fluid circuit between said pump and motor units to bypass fluids around said motor unit, a second governor operated by said engine output shaft and means actuated by said second governor to close said bypass valve when said engine output shaft reaches a predetermined speed to thereby apply power to the load gradually.

8. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor in series with said first compressor rotor and supplying air to said combustion chamber; a differential gear set, said shaft forming the input to said gear set; a pair of output shafts for said differential gear set, one of said output shafts being connected to an external load; a continuously variable torque multiplying transmission interposed between a first output of said differential gear set and a second output thereof, means mounting said second compressor rotor for rotation independently of said turbine rotor and compressor rotor and means for driving said second compressor rotor from the other differential output shaft.

9. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor in series with said first compressor rotor and supplying air to said combustion chamber; a differential gear set, said shaft forming the input to said gear set; a pair of output shafts for said differential gear set, one of said output shafts being connected to an external load; a continuously variable torque multiplying transmission interposed between the other output of said differential gear set and said one output thereof, means mounting said second compressor rotor for rotation independently of said turbine rotor and compressor rotor, means for driving said second compressor rotor from the other differential output shaft and a check valve between said compressor rotors whereby air is supplied directly to said first compressor rotor when said second compressor rotor is operating at low speed, said valve closing when said second compressor rotor is supplying substantial quantities of air to said combustion chamber through said first rotor.

10. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor in series with said first compressor rotor and also supplying air to said combustion chamber; a differential gear set, said shaft forming the input to said gear set; a pair of output shafts for said differential gear set, one of said output shafts being connected to an external load, a continuously variable hydrostatic transmission interposed between a first output of said differential gear set and a second output thereof, means mounting said second compressor rotor for rotation independently of said turbine rotor and compressor rotor and means for driving said second compressor rotor from the other differential output shaft.

11. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor which also supplies air to said combustion chamber; a differential gear set, said shaft forming the input to said gear set; a pair of output shafts for said differential gear set, one of said output shafts being connected to an external load, a hydrostatic pump unit mounted on the other of said differential output shafts, a hydrostatic motor unit mounted on said one of said differential output shafts, means interconnecting said hydrostatic units to form a continuously variable hydrostatic transmission, means mounting said second compressor rotor for rotation independently of said first compressor rotor and means for driving said second compressor rotor from said other differential output shaft.

12. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor which also supplies air to said combustion chamber, a differential gear set, said shaft forming the input to said gear set, a pair of output shafts for said differential gear set, one of said output shafts being connected to an external load, a hydrostatic pump unit mounted on the other of said differential output shafts, a hydrostatic motor unit mounted on said one of said differential output shafts, each of said hydrostatic units comprising a swash plate and a cylinder block having a plurality of bores therein with pistons displaceable in said bores, said cylinder blocks being mounted on the respective differential output shafts and said swash plates being mounted for movement about pivotal axes transverse to the respective shafts to control the displacement of the corresponding pistons in their cylinders, means comprising a porting plate having ports interconnecting said hydrostatic units to form a continuously variable hydrostatic transmission, means mounting said second compressor rotor for rotation independently of said first compressor rotor, means for driving said second compressor rotor from said other differential output shaft, means for successively adjusting the swash plates of said pump and motor units, a fuel supply valve and governor means biased in accordance with the position of said fuel supply valve and operated by said turbine engine output shaft for operating said swash plate operating means whereby as said turbine speed increases, said pump displacement first increases and said motor displacement successively decreases thereby reducing the torque transmitted hydraulically from said pump unit to said motor unit and simultaneously reducing the torque developed in said gas turbine engine while maintaining a substantially constant horsepower to drive the load.

13. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor which also supplies air to said combustion chamber; a differential gear set, said shaft forming the input to said gear set; a pair of output shafts for said differential gear set, one of said output shafts being connected to an external load; a hydrostatic pump unit comprising a block having a plurality of cylinder bores each with a displaceable piston therein and a plate mounted at a variable angle to said cylinder bores, means driven by said other differential output shaft for rotating said block relative to said plate, a hydrostatic motor unit comprising a block having a plurality of cylinder bores each with a displaceable piston therein and a plate mounted at a variable angle to said cylinder bores, means hydraulically interconnecting groups of cylinders of said pump unit with groups of cylinders on said motor unit, means driving said one output shaft from said motor unit, and means driving said second compressor rotor from said other shaft whereby when said external load prevents said one shaft from rotating, said other shaft rotates at high speed thereby supplying air to said turbine to permit increased fuel supply and consequent increased turbine power output without exceeding permissible turbine inlet temperature.

14. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor which also supplies air to said combustion chamber; a differential gear set, said shaft forming the input to said gear set; a pair of output shafts for said differential gear set, one of said output shafts being connected to an external load; a hydrostatic pump unit comprising a block having a plurality of cylinder bores each with a displaceable piston therein and a plate mounted at a variable angle to said cylinder bores, means driven by said other differential output shaft for rotating said block relative to said plate, a hydrostatic motor unit comprising a block having a plurality of cylinder bores each with a displaceable piston therein and a plate mounted at a variable angle to said cylinder bores, means hydraulically interconnecting groups of cylinders of said pump unit with groups of cylinders on said motor unit, means driving said one output shaft from said motor unit, means driving said second compressor rotor from said other shaft whereby when said load prevents said one shaft from rotating, said other shaft rotates at high speed thereby supplying air to said turbine to permit increased fuel supply and consequent increased turbine power output without exceeding permissible turbine inlet temperature, a fuel valve, a governor driven by said turbine common shaft and biased in accordance with the position of said fuel valve, and means actuated by said governor for successively varying the angle of said pump and motor plates relative to the respective cylinder blocks to successively increase the displacement of said pump pistons and decrease the displacement of said motor pistons as the turbine rotor speed increases, said action continuing until the power output of said turbine engine through said differential gear set alone balances the load and said second compressor rotor and said hydrostatic pump unit become stationary, said first compressor rotor then supplying sufficient air to maintain the power output at said load balancing level.

15. A prime mover-transmission comprising, in combination, a gas turbine engine having a turbine rotor and a compressor rotor mounted on a common shaft, a combustion chamber in which air from said compressor rotor is burned with fuel and the combustion products fed to said turbine rotor and having a second compressor rotor which also supplies air to said combustion chamber; a differential gear set, said shaft forming the input to said gear set; a pair of output shafts for said differential gear set, one of said output shafts being connected to an external load; a hydrostatic pump unit comprising a block having a plurality of cylinder bores each with a displaceable piston therein and a plate mounted at a variable angle to said cylinder bores, means driven by said other differential output shaft for rotating said block relative to said plate, a hydrostatic motor unit comprising a block having a plurality of cylinder bores each with a displaceable piston therein and a plate mounted at a variable angle to said cylinder bores, means hydraulically interconnecting groups of cylinders of said pump unit with groups of cylinders on said motor unit, means driving said one output shaft from said motor unit, means driving said second compressor rotor from said other shaft whereby when said load prevents said one shaft from rotating, said other shaft rotates at high speed thereby supplying air to said turbine to permit increased fuel supply and consequent increased turbine power output without exceeding permissible turbine inlet temperature, a fuel valve, a governor driven by said turbine common shaft and biased in accordance with the position of said fuel valve, and means actuated by said governor for successively varying the angle of said pump and motor plates relative to the respective cylinder blocks to successively increase the displacement of said pump pistons and decrease the displacement of said motor pistons as the turbine rotor speed increases, said action continuing until the power output of said turbine engine through said differential gear set alone balances the load and said second compressor rotor and said hydrostatic pump unit become stationary, said first compressor rotor then supplying sufficient air to maintain the lower output at said load balancing level, said governor serving to actuate said plate in the opposite direction when the load increases to thereby permit said hydrostatic pump unit and said second compressor rotor to rotate thereby increasing the torque applied hydrostatically to the vehicle drive wheels and simultaneously increasing the torque output of said turbine engine to again balance the total output with the load.

References Cited by the Examiner
UNITED STATES PATENTS

| 2,960,825 | 11/1960 | Sampietro | 60—39.16 |
| 2,981,063 | 4/1961 | Wickman | 60—39.16 |
| 3,038,307 | 6/1962 | Oprecht | 60—39.16 |

FOREIGN PATENTS

| 611,447 | 9/1948 | Great Britain. |
| 897,264 | 5/1962 | Great Britain. |

DAVID J. WILLIAMOWSKY, *Primary Examiner.*

J. R. BENEFIEL, *Assistant Examiner.*